US012190850B2

(12) United States Patent
Jeong et al.

(10) Patent No.: US 12,190,850 B2
(45) Date of Patent: Jan. 7, 2025

(54) DISPLAY DRIVING DEVICE AND METHOD OF DRIVING DISPLAY SYSTEM

(71) Applicant: LX SEMICON CO., LTD., Daejeon (KR)

(72) Inventors: Byeong Ho Jeong, Daejeon (KR); Sung Ha Kim, Daejeon (KR)

(73) Assignee: LX SEMICON CO., LTD, Daejeon (KR)

( * ) Notice: Subject to any disclaimer, the term of this patent is extended or adjusted under 35 U.S.C. 154(b) by 0 days.

(21) Appl. No.: 18/073,092

(22) Filed: Dec. 1, 2022

(65) Prior Publication Data

US 2023/0206883 A1 Jun. 29, 2023

(30) Foreign Application Priority Data

Dec. 27, 2021 (KR) ........................ 10-2021-0187929

(51) Int. Cl.
*G09G 5/395* (2006.01)
*G09G 5/18* (2006.01)

(52) U.S. Cl.
CPC ............... *G09G 5/18* (2013.01); *G09G 5/395* (2013.01); *G09G 2310/027* (2013.01); *G09G 2310/08* (2013.01)

(58) Field of Classification Search
CPC .... G09G 5/18; G09G 5/395; G09G 2310/027; G09G 2310/08
See application file for complete search history.

(56) References Cited

U.S. PATENT DOCUMENTS

2008/0001944 A1* 1/2008 Chang .................. G09G 3/3688 345/214
2019/0304395 A1* 10/2019 Kim ..................... G09G 3/3291
2023/0282150 A1* 9/2023 Kyles ....................... G09G 3/14 345/204

* cited by examiner

*Primary Examiner* — Robert J Michaud
(74) *Attorney, Agent, or Firm* — Greenberg Traurig, LLP

(57) ABSTRACT

A display driving device according to the present disclosure capable of changing image data at a different time for each color when the image data is changed includes: a first array composed of sampling latches configured to latch n-bit image data for each channel; a second array composed of holding latches configured to latch the image data latched in the sampling latches at a latch timing determined for each latch group; a signal generation circuit configured to generate a latch enable signal which causes the holding latches to perform a latch operation at the latch timing determined for each latch group; and a third array including level shifters configured to shift a voltage level of the image data output from the holding latches.

17 Claims, 6 Drawing Sheets

DISPLAY DRIVING DEVICE AND METHOD OF DRIVING DISPLAY SYSTEM

CROSS-REFERENCE TO RELATED APPLICATIONS

This application claims the benefit of the Korean Patent Application No. 10-2021-0187929 filed on Dec. 27, 2021 which is hereby incorporated by reference as if fully set forth herein.

FIELD OF THE INVENTION

The present disclosure relates to a display device, and more specifically, to a display driving device and a method of driving a display system.

BACKGROUND

As an information society develops, demands for display devices which display images are increasing in various forms. In response to these demands, various types of display devices such as an organic light-emitting diode (OLED) display device as well as a conventional liquid crystal display (LCD) device are used.

Such a display device includes a plurality of source driver integrated circuits (ICs) for supplying a data voltage to data lines of a display panel, a plurality of gate driver ICs for sequentially supplying a gate pulse (or a scan pulse) to gate lines (or scan lines) of the display panel, and a timing controller for controlling the source driver ICs and the gate driver ICs.

In the case of a general source driver IC, when image data of one horizontal line is changed, image data of all colors is changed at the same time, and thus a voltage of a level shifter which changes a voltage level of the image data should also be changed simultaneously. Accordingly, since level shifters for all channels of one horizontal line simultaneously operate, there is a problem in that a current is concentrated and thus very large power noise is generated, and in addition, electromagnetic interference (EMI) for other circuits at the outside of the source driver IC increases.

SUMMARY

Accordingly, the present disclosure is directed to providing a display driving device and a method of driving a display system that substantially obviate one or more problems due to limitations and disadvantages of the related art.

An aspect of the present disclosure is directed to providing a display driving device and a method of driving a display system, which may change bits constituting image data at different times for colors when the corresponding image data is changed.

Further, an aspect of the present disclosure is directed to providing a display driving device and a method of driving a display system, which may change bits constituting image data for positions of latch cells where the bits are respectively latched at different latch timings when the corresponding image data is changed.

In addition, an aspect of the present disclosure is directed to providing a display driving device and a method of driving a display system, which may digitally generate a latch enable signal which indicates a latch timing based on a clock signal.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

A display driving device according to an aspect of the present disclosure includes: a first array composed of sampling latches configured to latch n-bit image data for each channel; a second array composed of holding latches configured to latch the image data latched in the sampling latches at a latch timing determined for each latch group; a signal generation circuit configured to generate a latch enable signal which causes the holding latches to perform a latch operation at the latch timing determined for each latch group; and a third array composed of level shifters configured to shift a voltage level of the image data output from the holding latches, wherein the latch group is composed of holding latches configured to latch image data of the same color.

A display driving device according to another aspect of the present disclosure includes: a first array composed of sampling latches configured to latch n-bit image data for each channel; a second array composed of holding latches configured to latch the image data latched in the sampling latches at a latch timing determined for each cell group; a signal generation circuit configured to generate a latch enable signal which causes the holding latches to perform a latch operation at the latch timing determined for each cell group; and a third array composed of level shifters configured to shift a voltage level of the image data output from the holding latches, wherein the cell group is composed of latch cells at the same position among latch cells constituting each holding latch.

A method of driving a display system according to still another aspect of the present disclosure includes: latching, by sampling latches, n-bit image data generated for each channel; generating a latch enable signal which causes holding latches to perform a latch operation at different latch timings determined for each latch group or each cell group; latching, by the holding latches, the image data latched in the sampling latches at the different latch timings according to the latch enable signal generated for each latch group or each cell group; and shifting a voltage level of the image data latched in the holding latches.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
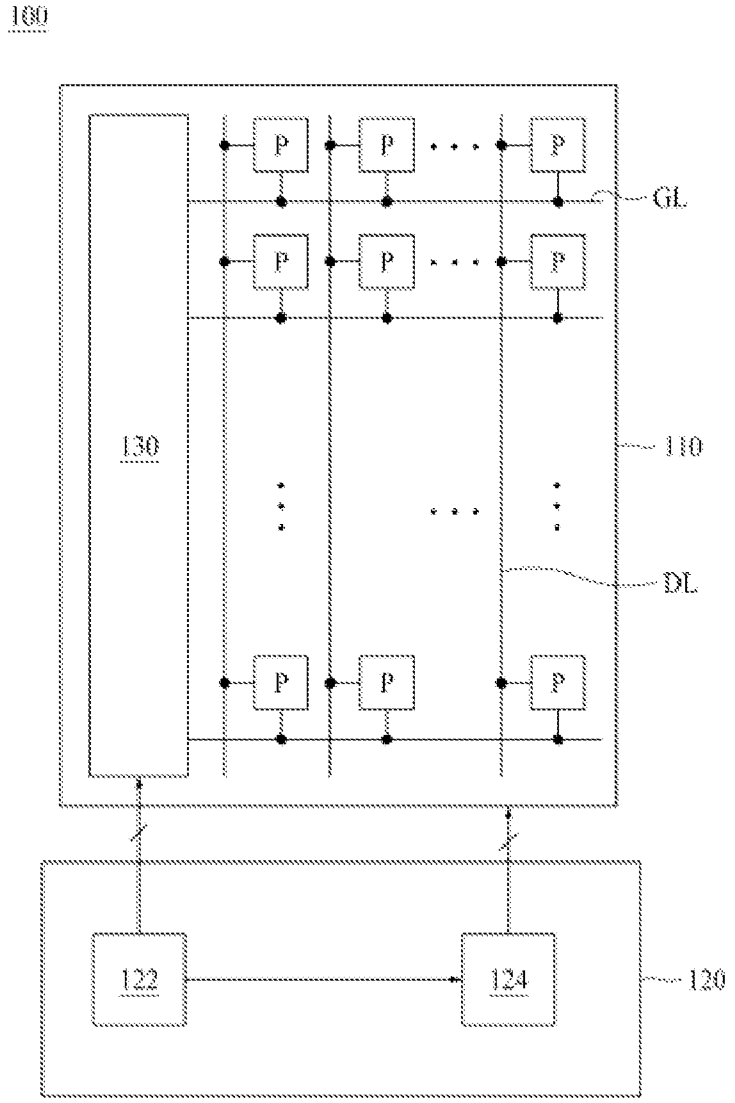
FIG. 1 is a view illustrating a configuration of a display system to which a display driving device according to one embodiment of the present disclosure is applied.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

FIG. 1 is a view illustrating a configuration of a display system to which a display driving device according to one embodiment of the present disclosure is applied.

A display system 100 shown in FIG. 1 is an electronic device including a display driving device 120 according to the present disclosure, and for example, may be a mobile device using a voltage of a battery as an operating voltage.

Examples of the mobile device may include at least one among a laptop computer, a Mobile Internet device (MID), an Internet of Things (IoT) device, a tablet PC, and a smart phone.

Referring to FIG. 1, the display system 100 according to the present disclosure includes a display panel 110 and a display driving device 120 for driving the display panel 110.

The display panel 110 includes data lines DL, gate lines GL which intersect the data lines DL, and pixels P disposed in a region defined by the data lines DL and the gate lines GL. The pixels P may be disposed in a matrix form.

The data lines DL supply a data signal input from the display driving device 120 to the pixels P. The gate lines GL supply a gate signal input from a gate driver 130 to the pixels P. Each pixel P may include sub-pixels (not shown) of different colors for implementing colors. The sub-pixels may include red sub-pixels, green sub-pixels, and blue sub-pixels. In one embodiment, the sub-pixels may include two green sub-pixels. That is, each pixel P may include a red sub-pixel, a first green sub-pixel, a blue sub-pixel, and a second green sub-pixel.

Further, each pixel P may include a white sub-pixel. According to this embodiment, each pixel P may include the red sub-pixel, the green sub-pixels, the blue sub-pixel, and the white sub-pixel.

In one embodiment, the display panel 110 according to the present disclosure may be an organic light-emitting diode (OLED) display panel. In this case, each pixel P may include an organic light-emitting diode (OLED), a driving transistor DT for controlling an amount of current flowing through the organic light-emitting diode (OLED), at least one switching transistor for controlling an operation of the driving transistor DT, and at least one capacitor.

In another embodiment, the display panel 110 according to the present disclosure may be a liquid crystal display (LCD) panel.

Meanwhile, the display panel 110 according to the present disclosure may be formed with the gate driver 130. The gate driver 130 includes a shift register (not shown). The shift register outputs a gate pulse synchronized with a data signal in response to a gate timing control signal input through the display driving device 120.

The gate timing control signal includes a gate start pulse and a gate shift clock. The shift register generates a gate pulse by shifting the gate start pulse according to the gate shift clock timing and sequentially supplies the gate pulse to the gate lines GL.

The switching transistors included in each pixel P of the display panel 110 are turned on according to the gate pulse to select the data line DL of the display panel 110 to which the data signal is input. In this case, the shift register included in the gate driver 130 may be directly formed on a substrate of the display panel 110 along with a transistor array including in a pixel array in the same process.

The display driving device 120 supplies a data signal for an image to be displayed through the display panel 110 to the data lines DL, and supplies a gate timing control signal including clock signals CLK to the gate driver 130.

To this end, as shown in FIG. 1, the display driving device 120 includes a timing controller 122 and a data driver 124.

In FIG. 1, the timing controller 122 is illustrated as being included in the display driving device 120, but this is only an example, and the timing controller 122 may be installed separately from the display driving device 120.

The timing controller 122 controls operations of the data driver 124 and the gate driver 130.

Specifically, the timing controller 122 generates n-bit image data for each channel based on input data input from a host system (not shown), and transmits the n-bit image data to the data driver 124. In one embodiment, the n-bit image data generated for each channel may be transmitted to the data driver 124 in a serial manner. Further, the timing controller 122 controls the operations of the data driver 124 and the gate driver 130 so that the data signal corresponding to the image data for each channel may be supplied to the pixels P included in the display panel 110.

In one embodiment, the timing controller 122 may generate a data timing control signal for controlling the operation of the data driver 124 or a gate timing control signal for controlling the operation of the gate driver 130 from timing signals. The timing control signals may include a vertical synchronization signal Vsync, a horizontal synchronization signal Hsync, a clock signal CLK, a data enable signal DE, and the like.

The data timing control signal may include a source start pulse SSP, a source sampling clock SSC, a source output enable signal, and the like. The gate timing control signal may include a gate start pulse GSP, a gate shift clock GSC, a gate output enable signal, and the like.

The source start pulse controls a data sampling start timing of the data driver 124. The source sampling clock is a clock signal which controls a sampling timing of data in the data driver 124. Hereinafter, for convenience of description, the source sampling clock will be expressed as a clock CLK or the clock signal CLK. The source output enable signal controls an output timing of the data signal.

The gate start pulse controls an operation start timing of the gate driver 130. The gate shift clock is a clock signal input to the gate driver 130, and controls a shift timing of the gate pulse. The gate output enable signal designates timing information of the gate driver 130.

The data driver 124 converts the image data for each channel input from the timing controller 122 to an analog data signal. The data driver 124 supplies the converted data signal to each pixel P of the display panel 110 through the data line DL according to the data timing control signal input from the timing controller 122.

Specifically, when the pieces of image data for the channels input from the timing controller 122 are simultaneously changed, the data driver 124 according to the present disclosure may change the image data for each channel at different times for each predetermined latch group or cell group to solve a problem in that power noise is generated due to a current concentration phenomenon.

Hereinafter, characteristics of the data driver 124 according to the present disclosure will be described in detail with reference to FIGS. 2 to 6. A first embodiment in which the data driver 124 changes the image data for each channel at the different times for each predetermined latch group will be described first, and then a second embodiment in which the data driver 124 changes the image data for each channel at the different times for each predetermined cell group will be described.

First Embodiment

Figure 2:
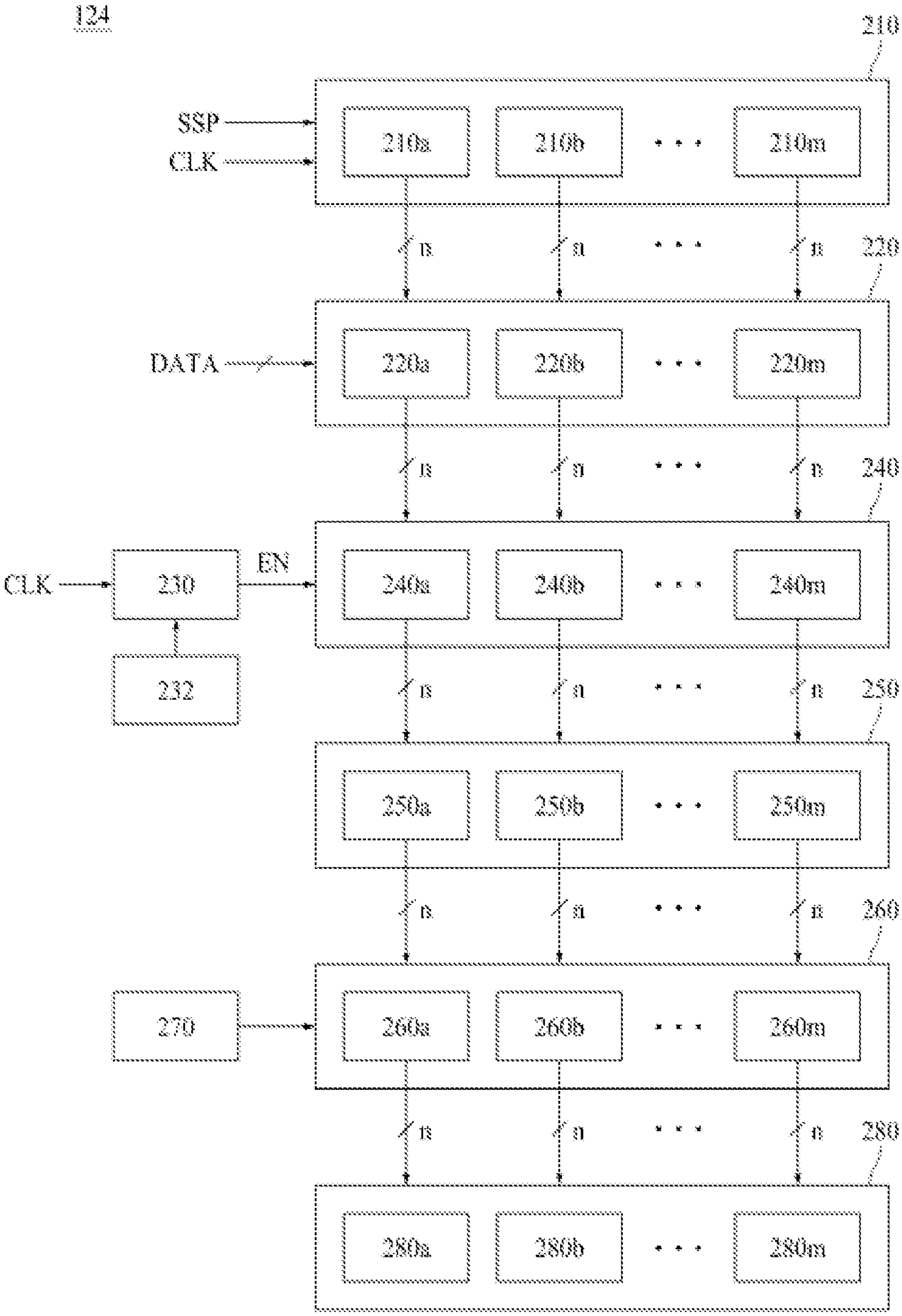
FIG. 2 is a block diagram illustrating a configuration of a data driver shown in FIG. 1.

FIG. 2 is a block diagram illustrating a configuration of a data driver according to the first embodiment of the present disclosure.

As shown in FIG. 2, the data driver 124 according to the first embodiment of the present disclosure includes a first array 210, a second array 220, a signal generation circuit 230, a third array 240, a level shifter array 250, a fourth array 260, a gamma voltage generation circuit 270, and a fifth array 280.

The first array 210 is composed of a plurality of shift registers **210*a* to 210*m*, and the second array 220 is composed of a plurality of sampling latches 220*a* to 220*m*. The third array 240 is composed of a plurality of holding latches 240*a* to 240*m*, and the level shifter array 250 is composed of a plurality of level shifters 250*a* to 250*m*. The fourth array 260 is composed of a plurality of digital-to-analog converters 260*a* to 260*m*, and the fifth array 280 is composed of a plurality of output buffers 280*a* to 280*m***.

In the above-described embodiment, the number of each of the shift registers **210*a* to 210*m*, the sampling latches 220*a* to 220*m*, the holding latches 240*a* to 240*m*, the level shifters 250*a* to 250*m*, the digital-to-analog converters 270*a* to 270*m*, and the output buffers 280*a* to 280*m* may be determined according to the number of channels (or data lines) included in the display panel 110**.

The shift registers **210*a* to 210*m* included in the first array 210 sequentially shift a source start pulse SSP using a source sampling clock (SSC, or a clock signal) and respectively input the source start pulse SSP to the sampling latches 220*a* to 220*m* to sequentially operate the sampling latches 220*a* to 220*m***.

The sampling latches **220*a* to 220*m* included in the second array 220 synchronize image data DATA of each channel input from the timing controller 122 in series with the source start pulse SSP input from the shift registers 210*a* to 210*m* respectively connected to the sampling latches 220*a* to 220*m* to perform sampling. In one embodiment, when the image data of each channel is composed of n bits, each of the sampling latches 220*a* to 220*m*** may be composed of n latch circuits or n flip-flops for latching the n-bit image data.

The holding latches **240*a* to 240*m* included in the third array 240 latch the pieces of image data for the channels output from the sampling latches 220*a* to 220*m* according to a latch enable signal EN generated by the signal generation circuit 230. The holding latches 240*a* to 240*m* may be composed of n latch circuits or n flip-flops for latching n-bit image data like the sampling latches 220*a* to 220*m***.

Hereinafter, for convenience of description, a configuration which latches the image data in units of n bits will be defined as a latch, and a configuration which latches one bit in each latch will be defined as a latch cell.

In one embodiment, the holding latches **240*a* to 240*m* may latch the pieces of image data latched in the sampling latches 220*a* to 220*m* at different latch timings according to the latch enable signal EN generated for each latch group. In this case, the latch group is composed of a predetermined number of holding latches 240*a* to 240*m***.

In one embodiment, the latch group may include holding latches which latch image data of the same color. For example, when each pixel P included in the display panel

110 includes four sub-pixels, and the sub-pixels are composed of the red sub-pixel, the first green sub-pixel, the blue sub-pixel, and the second green sub-pixel, the latch group may include a first latch group composed of holding latches in which image data of the red sub-pixel is latched, a second latch group composed of holding latches in which image data of the first green sub-pixel is latched, a third latch group composed of holding latches in which image data of the blue sub-pixel is latched, and a fourth latch group composed of holding latches in which image data of the second green sub-pixel is latched.

According to this embodiment, the holding latches included in the first latch group, the holding latches included in the second latch group, the holding latches included in the third latch group, and the holding latches included in the fourth latch group operate at different timings to latch the pieces of image data latched in the sampling latches 220*a* to 220*m* at different latch timings.

That is, the holding latches included in the first latch group simultaneously operate at a first latch timing to simultaneously latch the pieces of red image data output from the sampling latches. The holding latches included in the second latch group simultaneously operate at a second latch timing to simultaneously latch the pieces of first green image data output from the sampling latches. The holding latches included in the third latch group simultaneously operate at a third latch timing to simultaneously latch the pieces of blue image data output from the sampling latches. The holding latches included in the fourth latch group simultaneously operate at a fourth latch timing to simultaneously latch the pieces of second green image data output from the sampling latches.

Like the above, according to the present disclosure, since the image data for each channel is latched in the holding latches at the different latch timings for the colors, the power noise generated due to current concentration by the simultaneous latching (or change) of the image data is dispersed, and accordingly, electromagnetic interference (EMI) decreases.

In one embodiment, the second latch group composed of the holding latches which latch the first green image data and the fourth latch group composed of the holding latches which latch the second green image data may perform a latch operation before the first latch group composed of the holding latches which latch the red image data and the third latch group composed of the holding latches which latch the blue image data to change the first and second green image data before the red and blue image data. This is because a green color is recognized better by eyes of a user watching an image, and thus an image change delay caused by dispersing and changing the image data for each color may be minimally recognized by the user by changing the green image data first.

In the above-described embodiment, it is described that each pixel P is composed of the red sub-pixel, the first green sub-pixel, the blue sub-pixel, and the second green sub-pixel, but as another example, each pixel P included in the display panel 110 may also include a red sub-pixel, green sub-pixels, a blue sub-pixel, and a white sub-pixel. According to this example, the latch groups may include a latch group composed of holding latches in which image data of the red sub-pixel is latched, a latch group composed of holding latches in which image data of the green sub-pixels are latched, a latch group composed of holding latches in which image data of the blue sub-pixel is latched, and a latch group composed of holding latches in which image data of the white sub-pixel is latched.

The signal generation circuit 230 generates the latch enable signal EN for enabling an operation of the holding latches 240*a* to 240*m* for each latch group. As described above, the signal generation circuit 230 may generate the latch enable signal EN so that the holding latches perform the latch operation at different latch timings for the latch groups.

Hereinafter, a case in which the signal generation circuit 230 generates a latch enable signal for each latch group according to the present disclosure will be described in more detail with reference to FIG. 3.

Figure 3:
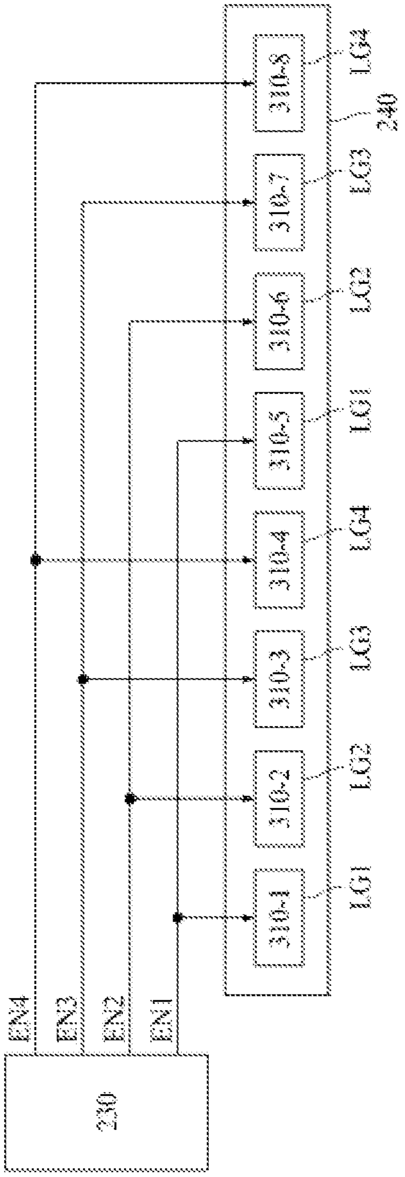
FIG. 3 is a view illustrating a latch enable signal generated for each latch group according to a first embodiment of the present disclosure.

In an example shown in FIG. 3, for convenience of description, it is assumed that the display panel 110 includes eight channels, the third array 240 is composed of eight holding latches 310-1 to 310-8, and the latch groups include a first latch group LG1, a second latch group LG2, a third latch group LG3, and a fourth latch group LG4. In this case, the first latch group LG1 is composed of the holding latches 310-1 and 310-5 which latch image data of a red sub-pixel, and the second latch group LG2 is composed of the holding latches 310-2 and 310-6 which latch image data of a first green sub-pixel. Further, the third latch group LG3 is composed of the holding latches 310-3 and 310-7 which latch image data of a blue sub-pixel, and the fourth latch group LG4 is composed of the holding latches 310-4 and 310-8 which latch image data of a second green sub-pixel.

The signal generation circuit 230 generates a first latch enable signal EN1 for the first latch group LG1 and applies the first latch enable signal EN1 to the holding latches 310-1 and 310-5 of the first latch group LG1, and generates a second latch enable signal EN2 for the second latch group LG2 and applies the second latch enable signal EN2 to the holding latches 310-2 and 310-6 of the second latch group LG2. The signal generation circuit 230 generates a third latch enable signal EN3 for the third latch group LG3 and applies the third latch enable signal EN3 to the holding latches 310-3 and 310-7 of the third latch group LG3, and generates a fourth latch enable signal EN4 for the fourth latch group LG4 and applies the fourth latch enable signal EN4 to the holding latches 310-4 and 310-8 of the fourth latch group LG4. According to application of the first to fourth latch enable signals EN1 to EN4, the first to fourth latch groups LG1 to LG4 may perform the latch operation at different latch timings, and the holding latches included in the same latch group may simultaneously perform the latch operation.

In one embodiment, the signal generation circuit 230 may cause the holding latches of each latch group to latch the image data output from the sampling latches during a section in which the latch enable signal is at a high level, and may cause the holding latches to latch the image data at different timings for the latch groups by generating latch enable signals so that high-level sections of the latch enable signals for each latch group do not overlap each other.

In one embodiment, the signal generation circuit 230 may generate the latch enable signals for each latch group so that the latch enable signal for each latch group transitions from a low level to a high level when a first number of clock pulses is counted from a rising edge of a horizontal synchronization signal Hsync which indicates a start of one horizontal line, and transitions from the high level to the low level when a second number of clock pulses is counted from the rising edge. In this case, the first number of clock pulses and the second number of clock pulses are set differently for each latch group.

Like the above, according to the present disclosure, since the signal generation circuit 230 generates the latch enable signals using a number of clock pulses counted based on the rising edge of the horizontal synchronization signal Hsync, and thus the latch enable signals may be generated in a digital manner, accuracy of the latch enable signals may be improved compared to a method of generating the latch enable signals in an analog manner using a delay circuit or the like.

According to this embodiment, information which indicates a latch timing at which the image data for each channel for each latch group is latched may be stored in a register 232, and the signal generation circuit 230 may generate the latch enable signal of each latch group based on the latch timing for each latch group stored in the register 232. In this case, as described above, the latch timing at which the image data for each channel is latched may be defined as the number of clock pulse signals.

Figure 4:
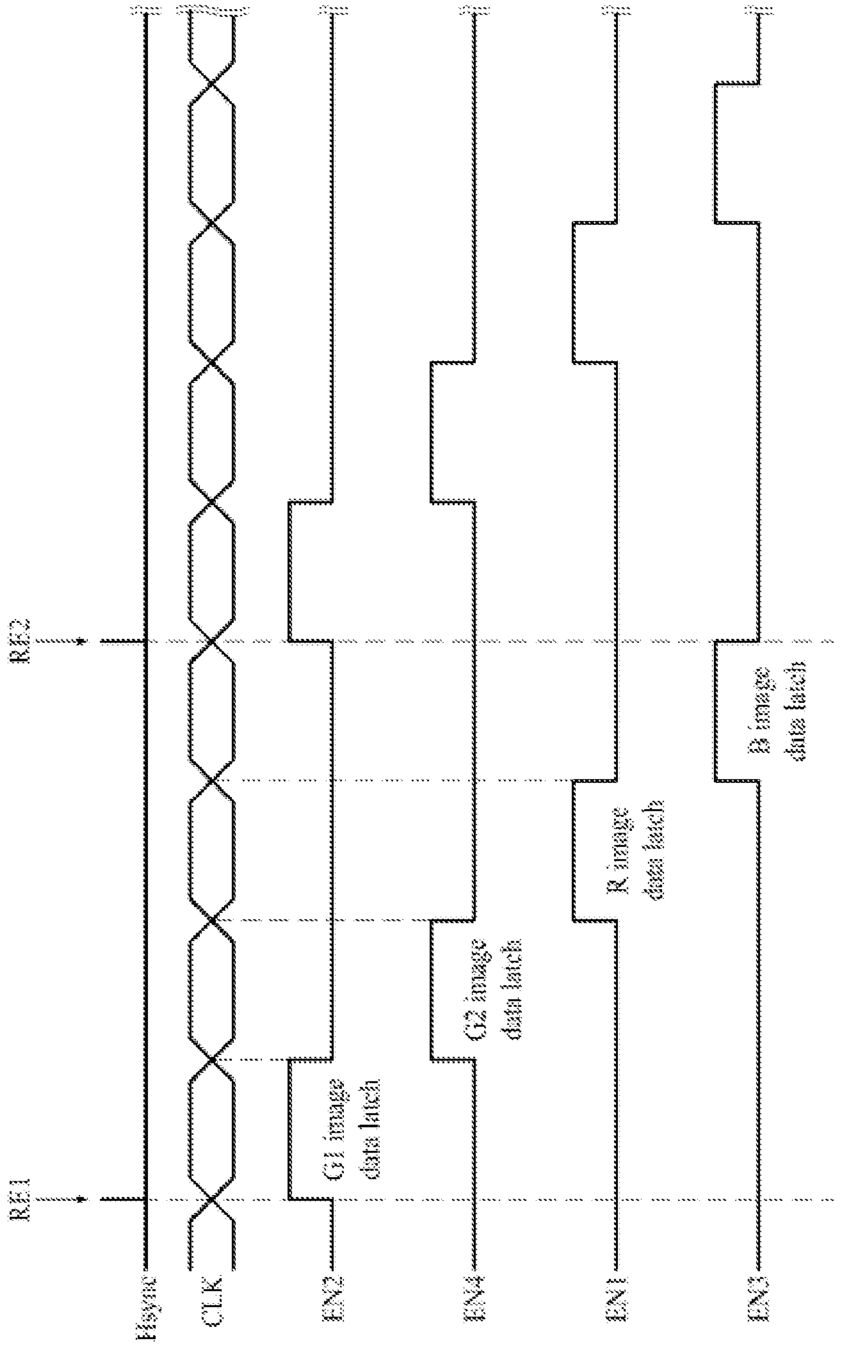
FIG. 4 is a view illustrating an example of a method in which holding latches latch image data at different latch timings for latch groups according to the first embodiment of the present disclosure.

For example, as shown in FIG. 4, when four latch groups are formed for each color, the signal generation circuit 230 generates the second latch enable signal EN2 for the second latch group LG2. The second latch enable signal EN2 may transition from the low level to the high level at the same timing as a rising edge RE1 of the horizontal synchronization signal Hsync which indicates the start of one horizontal line (a time at which a first clock signal is counted), and may transition from the high level to the low level at a time at which a second clock signal is counted from the rising edge RE1 of the horizontal synchronization signal Hsync.

The signal generation circuit 230 generates the fourth latch enable signal EN4 for the fourth latch group LG4. The fourth latch enable signal EN4 may transition from the low level to the high level at the time at which the second clock signal is counted from the rising edge RE1 of the horizontal synchronization signal Hsync, and may transition from the high level to the low level at a time at which a third clock signal is counted from the rising edge RE1 of the horizontal synchronization signal Hsync.

The signal generation circuit 230 generates the first latch enable signal EN1 for the first latch group LG1. The first latch enable signal EN1 may transition from the low level to the high level at the time at which the third clock signal is counted from the rising edge RE1 of the horizontal synchronization signal Hsync, and may transition from the high level to the low level at a time at which a fourth clock signal is counted from the rising edge RE1 of the horizontal synchronization signal Hsync.

The signal generation circuit 230 generates the third latch enable signal EN3 for the third latch group LG3. The third latch enable signal EN3 may transition from the low level to the high level at the time at which the fourth clock signal is counted from the rising edge RE1 of the horizontal synchronization signal Hsync, and may transition from the high level to the low level at a time at which a fifth clock signal is counted from the rising edge RE1 of the horizontal synchronization signal Hsync.

As described above, the signal generation circuit 230 may generate latch enable signals of which high-level sections do not overlap each other for each latch group, and the holding latches may operate at different timings for the latch groups according to the latch enable signals generated for each latch group.

Referring to FIG. 2 again, when the image data for the channels is latched in the holding latches 240*a* to 240*m* for each latch group, the level shifters 250*a* to 250*m* included in the level shifter array 250 changes a voltage level of the image data for the channels latched in the holding latches 240*a* to 240*m* to a predetermined voltage level. In this case, since the level shifters 250*a* to 250*m* operate at the same timing as the holding latches 240*a* to 240*m*, respectively, the level shifters 250*a* to 250*m* also operate at the different timings for the colors of the image data for the channels. Accordingly, since a current concentration phenomenon which occurs as all of the level shifters 250*a* to 250*m* operate at the same time may be prevented, the generation of power noise due to the current concentration phenomenon may be prevented.

The digital-to-analog converters 260*a* to 260*m* included in the fourth array 260 convert the image data for each channel of which a voltage level is shifted using a gray scale voltage generated by the gamma voltage generation circuit 270 to a data signal (data voltage) in an analog form.

The gamma voltage generation circuit 270 generates a plurality of gray scale voltages V0 to V255 for outputting the image data for each channel using a resistor string, and supplies the generated gray scale voltages to the digital-to-analog converters 260*a* to 260*m*.

The output buffers 280*a* to 280*m* included in the fifth array 280 amplify the data signals for the channels output from the digital-to-analog converters 260*a* to 260*m* to output the data signals to the pixels P of the display panel through the data lines DL respectively corresponding to the channels.

Hereinafter, a method in which the holding latches according to the present disclosure latch the image data at the different timings will be described in more detail with reference to FIGS. 3 and 4.

In an example shown in FIG. 4, for convenience of description, a case in which it is assumed that the image data for each channel is composed of 6 bits and the holding latches, which latch the first and second green image data, latch the image data before the holding latches, which latch the red and blue image data, will be described.

As shown in FIGS. 3 and 4, when the second latch enable signal EN2 for the second latch group LG2 is applied to the second and sixth holding latches 310-2 and 310-6 from the signal generation circuit 230, the second and sixth holding latches 310-2 and 310-6 latch the first green image data G1 output from the corresponding sampling latches (not shown) during a section in which the second latch enable signal EN2 is at a high level.

Thereafter, when the fourth latch enable signal EN4 for the fourth latch group LG4 composed of the fourth and eighth holding latches 310-4 and 310-8 in which second green image data G2 is latched is applied to the fourth and eighth holding latches 310-4 and 310-8 from the signal generation circuit 230, the fourth and eighth holding latches 310-4 and 310-8 latch the second green image data G2 output from the corresponding sampling latches (not shown) during a section in which the fourth latch enable signal EN4 is at a high level.

Thereafter, when the first latch enable signal EN1 for the first latch group LG1 composed of the first and fifth holding latches 310-1 and 310-5 in which red image data R is latched is applied to the first and fifth holding latches 310-1 and 310-5 from the signal generation circuit 230, the first and fifth holding latches 310-1 and 310-5 latch the red image data R output from the corresponding sampling latches during a section in which the first latch enable signal EN1 is at a high level.

Thereafter, when the third latch enable signal EN3 for the third latch group LG3 composed of the third and seventh holding latches 310-3 and 310-7 in which blue image data B is latched is applied to the third and seventh holding latches 310-3 and 310-7 from the signal generation circuit 230, the third and seventh holding latches 310-3 and 310-7 latch the blue image data B output from the corresponding sampling latches during a section in which the third latch enable signal EN3 is at a high level.

As can be seen in FIGS. 3 and 4, since the holding latches 310-1 to 310-8 included in the latch groups LG1 to LG4 latch the image data for the channels at different latch timings according to the latch enable signals EN1 to EN4 respectively generated for the latch groups LG1 to LG4, it can be seen that the data latch timings are dispersed between the holding latches 310-1 to 310-8.

In the above-described embodiment, it is described that the holding latches 240*a* to 240*m* latch the image data for the channels at different latch timings for the latch groups each composed of the plurality of holding latches 240*a* to 240*m*. However, in another embodiment, the holding latches 240*a* to 240*m* may latch the image data for the channels at different timings for each predetermined cell group.

Hereinafter, the second embodiment in which the holding latches 240*a* to 240*m* latch image data for channels at different latch timings for cell groups will be described in detail.

Second Embodiment

Since a configuration of the data driver 124 according to the second embodiment is the same as the configuration shown in FIG. 2, and functions of the shift registers 210*a* to 210*m*, the sampling latches 220*a* to 220*m*, the digital-to-analog converters 260*a* to 260*m*, the gamma voltage generation circuit 270, and the output buffers 280*a* to 280*m* according to the second embodiment are the same as those shown in the first embodiment, hereinafter, the second embodiment will be described mainly with functions of the signal generation circuit 230, the holding latches 240*a* to 240*m*, and the level shifters 250*a* to 250*m*.

The holding latches 240*a* to 240*m* latch bits of pieces of image data for channels output from the sampling latches 220*a* to 220*m* at different timings according to latch enable signals generated for each predetermined cell group.

In one embodiment, the cell group may be composed of latch cells having the same position in each of the holding latches 240*a* to 240*m*. For example, when the holding latches 240*a* to 240*m* are holding latches 240*a* to 240*m* which latch n-bit image data, first latch cells in which the most significant bits (MSBs) are latched may be set as a first cell group, second latch cells in which second bits are latched in the holding latches 240*a* to 240*m* may be set as a second cell group, and nth latch cells in which least significant bits (LSBs) are latched in the holding latches 240*a* to 240*m* may be set as an nth cell group.

According to this embodiment, among the holding latches 240*a* to 240*m*, the latch cells included in the first cell group, the latch cells included in the second cell group, and the latch cells included in the nth cell group latch the bits of the image data output from the sampling latches 220*a* to 220*m* at different latch timings.

That is, the latch cells included in the first cell group simultaneously latch the most significant bits, which are the first bits of the pieces of image data at a first latch timing, and the latch cells included in the second cell group simultaneously latch the second bits of the pieces of image data at a second latch timing, and the latch cells included in the nth cell group simultaneously latch the least significant bits, which are the last bits of the pieces of image data at an nth latch timing.

Like the above, according to the present disclosure, since the bits of the image data for the channels are latched in the holding latches 240*a* to 240*m* at different latch timings set for the latch cells, current concentration which occurs due to simultaneous change of all bits when the image data is changed may be prevented, and accordingly, power noise may be dispersed and EMI may also be decreased.

In one embodiment, the bits of the pieces of image data may be sequentially latched in the holding latches 240*a* to 240*m* in an order from the first cell group composed of the latch cells in which the most significant bits are latched to the nth cell group composed of the latch cells in which the least significant bits are latched. This is to prevent the user's eyes from recognizing an image difference which may occur due to dispersion of a change time of the bits constituting the image data by changing the most significant bits first.

In the above-described embodiment, it is described that each cell group includes one latch cell for each holding latch 240*a* to 240*m*, but in another embodiment, two or more latch cells for each holding latch 240*a* to 240*m* may be included in one cell group. For example, when the image data is composed of n bits, the data driver 124 includes m holding latches 240*a* to 240*m*, and two latch cells are included for each holding latch in one cell group, n/2 cell groups may be generated, and each cell group may be composed of 2×m latch cells.

The signal generation circuit 230 generates the latch enable signal for enabling an operation of the holding latches 240*a* to 240*m* for each cell group. For example, when n cell groups are formed, since the signal generation circuit 230 may generate one latch enable signal for each cell group, a total of n latch enable signals may be generated.

Hereinafter, a case in which the signal generation circuit 230 generates the latch enable signal for each cell group according to the second embodiment of the present disclosure will be described in more detail with reference to FIG. 5.

Figure 5:
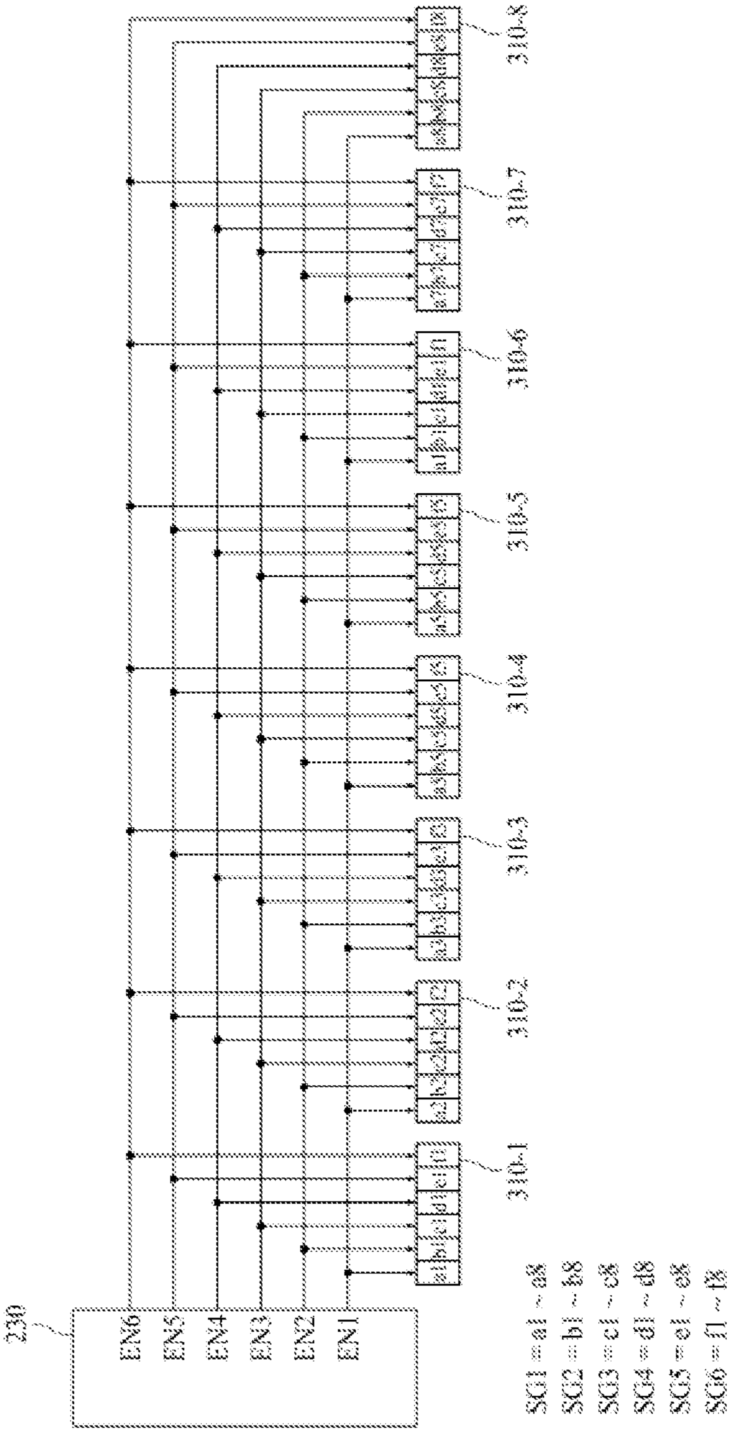
FIG. 5 is a view illustrating a latch enable signal generated for each cell group according to a second embodiment of the present disclosure.

In an example shown in FIG. 5, for convenience of description, it is assumed that the display panel 110 includes eight channels, the third array 240 is composed of eight holding latches 310-1 to 310-8, and the image data for each channel is composed of six bits, and thus each of the holding latches 310-1 to 310-8 includes six latch cells and six cell groups SG1 to SG6 are formed by grouping the latch cells at the same positions.

The signal generation circuit 230 generates a first latch enable signal EN1 for a first cell group SG1 and applies the first latch enable signal EN1 to latch cells a1 to a8 of the first cell group SG1, generates a second latch enable signal EN2 for a second cell group SG2 and applies the second latch enable signal EN2 to latch cells b1 to b8 of the second cell group SG2, generates a third latch enable signal EN3 for a third cell group SG3 and applies the third latch enable signal EN3 to latch cells c1 to c8 of the third cell group SG3, generates a fourth latch enable signal EN4 for a fourth cell group SG4 and applies the fourth latch enable signal EN4 to latch cells d1 to d8 of the fourth cell group SG4, generates a fifth latch enable signal EN5 for a fifth cell group SG5 and applies the fifth latch enable signal EN5 to latch cells e1 to e8 of the fifth cell group SG5, and generates a sixth latch enable signal EN6 for a sixth cell group SG6 and applies the sixth latch enable signal EN6 to latch cells f1 to f8 of the sixth cell group SG6.

According to application of the first to sixth enable signals EN1 to EN6, the first to sixth cell groups SG1 to SG6 may perform a latch operation at different latch timings, and the latch cells included in the same cell group may simultaneously perform the latch operation.

In one embodiment, the signal generation circuit 230 may generate the latch enable signals so that the latch cells of the holding latches 240*a* to 240*m* may latch the bits output from the sampling latches 220*a* to 220*m* at a latch timing designated for each cell group during a section in which the latch enable signals of each cell group are at a high level. In this case, the signal generation circuit 230 may cause the latch cells of the holding latches 240*a* to 240*m* to latch the bits of the image data at different latch timings for the cell groups by generating latch enable signals so that high-level sections of the latch enable signals of each cell group do not overlap each other.

In the above-described embodiment, the signal generation circuit 230 may generate the latch enable signals for each cell group to transition from a low level to a high level when a first number of clock pulses is counted from a rising edge of a horizontal synchronization signal Hsync which indicates a start of one horizontal line, and transition from the high level to the low level when a second number of clock pulses is counted from the rising edge. In this case, the first number of clock pulses and the second number of clock pulses may be set differently for each cell group.

According to this embodiment, information about a latch timing at which the bits of the image data for each cell group are latched may be stored in the register 232, and the signal generation circuit 230 may generate the latch enable signals of each cell group based on the latch timing for each cell group stored in the register 232. In this case, the latch timing may be defined as the number of clock pulse signals of CLK.

As described above, the signal generation circuit 230 may generate latch enable signals of which the high-level sections do not overlap each other for each cell group, and the latch cells of the holding latches 240*a* to 240*m* latch the bits of the image data for each channel at different latch timings according to the latch enable signals generated for the cell groups.

When the bits of the image data are latched in the latch cells of the holding latches 240*a* to 240*m* for each cell group, the level shifters 250*a* to 250*m* changes a voltage level of the bit latched in each latch cell to a predetermined voltage level. In this case, since the level shifters 250*a* to 250*m* operate at the same timing as the holding latches 240*a* to 240*m*, respectively, the level shifters 250*a* to 250*m* also operate at different timings for each cell group. Accordingly, since a current concentration phenomenon which occurs as all of the level shifters 250*a* to 250*m* operate at the same time may be prevented, the generation of power noise due to the current concentration phenomenon may be prevented.

Hereinafter, an example of a method in which the latch cells of the holding latches latch the bits at different latch timings for each cell group will be described with reference to FIGS. 5 and 6.

In the example shown in FIG. 6, for convenience of description, a case in which it is assumed that the image data for each channel is composed of six bits, the display panel 110 includes eight channels, and the bits are sequentially latched in an order from the first cell group SG1 composed of the latch cells which latch the most significant bits to the sixth cell group SG6 composed of the latch cells which latch the least significant bits will be described.

Eight sampling latches (not shown) sequentially sample and latch the image data for each channel in units of bits based on source start pulses input from shift registers (not shown).

Thereafter, when the first latch enable signal EN1 for the first cell group SG1 composed of the first latch cells a1 to a8 which latch the most significant bits D1 that are first bits of the pieces of image data for the channels is applied to the eight holding latches 310-1 to 310-8 from the signal generation circuit 230, the first latch cells a1 to a8 included in the eight holding latches 310-1 to 310-8 latch the most significant bits D1 output from the sampling latches during a section in which the first latch enable signal EN1 is at the high level.

Thereafter, when the second latch enable signal EN2 for the second cell group SG2 composed of the second latch cells b1 to b8 which latch second bits D2 is applied to the eight holding latches 310-1 to 310-8 from the signal generation circuit 230, the second latch cells b1 to b8 included in the eight holding latches 310-1 to 310-8 latch the second bits D2 output from the sampling latches during a section in which the second latch enable signal EN2 is at the high level.

The above-described processes are also repeated for third bits D3 to fifth bits D5 of the image data for each channel. Thereafter, when the sixth latch enable signal EN6 for the sixth cell group SG6 composed of the sixth latch cells f1 to f8 which latch the least significant bits D6 that are sixth bits of the pieces of image data for the channels is applied to the eight holding latches 310-1 to 310-8 from the signal generation circuit 230, the sixth latch cells f1 to f8 included in the eight holding latches 310-1 to 310-8 latch the least significant bits D6 output from the sampling latches during a section in which the sixth latch enable signal EN6 is at the high level.

Figure 6:
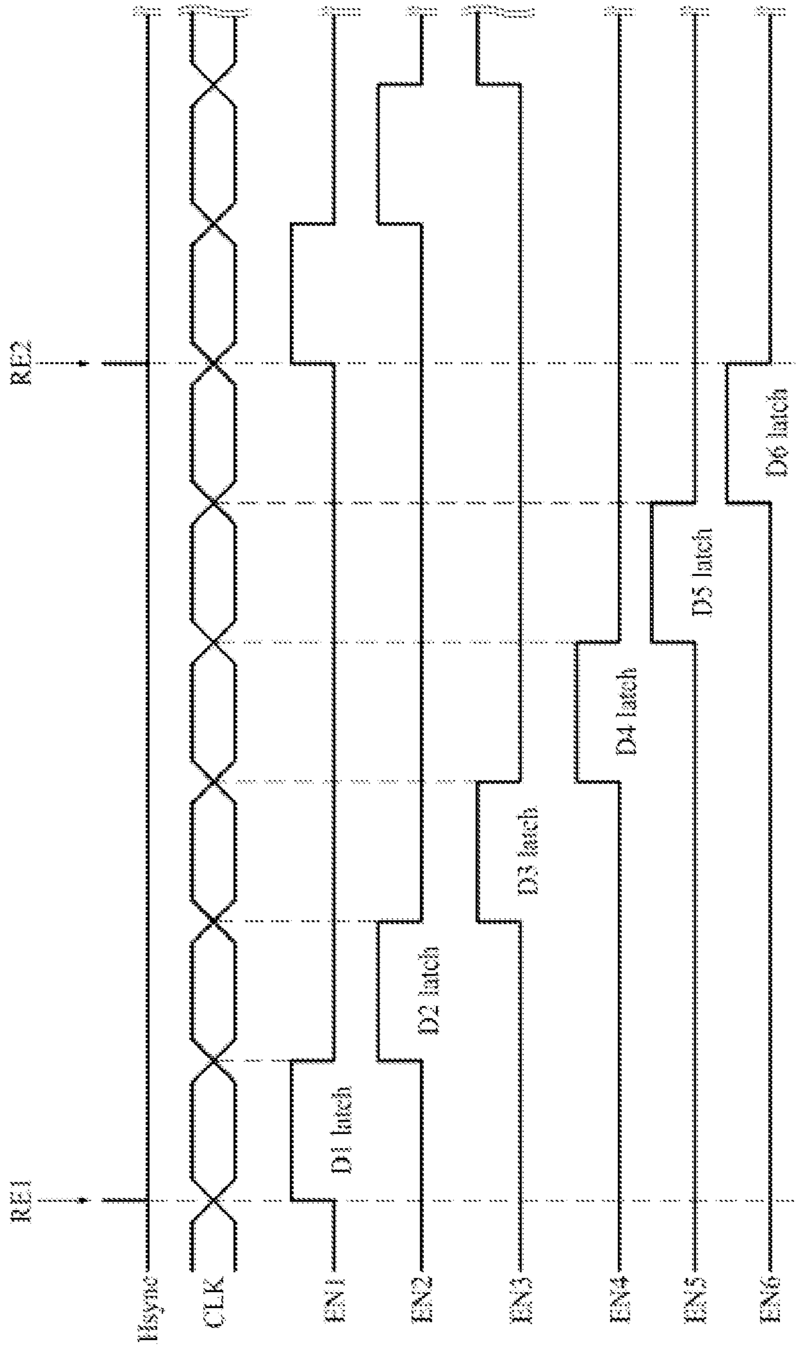
FIG. 6 is a view illustrating an example of a method in which latch cells latch bits of image data at different latch timings for cell groups according to the second embodiment of the present disclosure.

As can be seen in FIG. 6, since the latch cells of the holding latches 310-1 to 310-8 latch the bits of the image data at different latch timing according to the latch enable signals EN1 to EN6 generated for each cell group, it can be seen that the latch timings are dispersed in units of bits.

According to the present disclosure, since a latch timing at which bits of image data latched in sampling latches are latched in holding latches can be set differently for each color or bit, there is an effect in that a current concentration phenomenon which occurs as the bits of the image data are simultaneously changed can be prevented, and accordingly, power noise can be dispersed.

Further, according to the present disclosure, there is an effect in that circuits vulnerable to noise can be protected due to dispersion of the power noise, and electromagnetic interference (EMI) for external circuits of a source driver IC can be decreased.

In addition, according to the present disclosure, since a latch timing at which bits of image data latched in sampling latches are latched in holding latches can be set differently for each color or bit, there is an effect in that a time at which a load of a gamma voltage generation circuit which serves as a reference of the source driver IC is changed can be distributed, and thus a settling time becomes quicker.

It may be understood that those skilled in the art may modify the present invention in other detailed forms without changing the technical spirit or the essential feature.

All disclosed methods and procedures described herein may be implemented, at least in part, using one or more computer programs or components. These components may be provided as a series of computer instructions through any conventional computer-readable medium or machine-readable medium including volatile and nonvolatile memories such as random-access memories (RAMs), read only-memories (ROMs), flash memories, magnetic or optical disks, optical memories, or other storage media. The instructions may be provided as software or firmware, and may, in whole or in part, be implemented in a hardware configuration such as application-specific integrated circuits (ASICs), field-programmable gate arrays (FPGAs), digital signal processors (DSPs), or any other similar device. The instructions may be configured to be executed by one or more processors or other hardware configurations, and the processors or other hardware configurations are allowed to perform all or part of the methods and procedures disclosed herein when executing the series of computer instructions.

Therefore, the above-described embodiments should be understood to be exemplary and not limiting in every aspect. The scope of the present disclosure will be defined by the following claims rather than the above-detailed description, and all changes and modifications derived from the meaning and the scope of the claims and equivalents thereof should be understood as being included in the scope of the present disclosure.

What is claimed is:

1. A display driving device comprising:

a first array composed of a plurality of sampling latches configured to latch n-bit image data for each channel;

a second array composed of a plurality of holding latches configured to latch the image data latched in the sampling latches at a latch timing determined for each of a plurality of latch groups;

a signal generating circuit configured to generate a plurality of latch enable signal corresponding to the plurality of latch groups and apply each of the plurality of latch enable signals to the holding latches correspond of the plurality of latch groups so that holding latches included in different latch groups operate at different timings to latch image data latched in the sampling latches as different latch timing; and a third array composed of level shifters configured to shift a voltage level of the image data output from the holding latches, wherein each of the latch groups is composed of holding latches.

2. The display driving device of claim 1, wherein:

the latch enable signal for each latch group transitions from a low level to a high level when a first number of clock pulses is counted from a rising edge of a horizontal synchronization signal (Hsync) which indicates a start of one horizontal line, and transitions from the high level to the low level when a second number of clock pulses is counted from the rising edge; and the first number of clock pulses and the second number of the clock pulses are set differently for each latch group.

3. The display driving device of claim 1, wherein:

a unit pixel included in a display panel is composed of a red sub-pixel, a first green sub-pixel, a blue sub-pixel, and a second green sub-pixel; and the plurality of latch groups include a first latch group composed of holding latches configured to latch image data of the read sub-pixel, a second latch group composed of holding latches configured to latch image data of the first green sub-pixel, a third latch group composed of holding latches configured to latch image data of the blue sub-pixel, and a fourth latch group composed of holding latches configured to latch image data of the second green sub-pixel.

4. The display driving device of claim 3, wherein the holding latches included in the second and fourth latch groups perform a latch operation before the holding latches included in the first and third latch groups.

5. The display driving device of claim 1, further comprising a register in which different latch timings are recorded for each latch group, wherein the signal operation circuit generates the latch enable signal based on the latch timings for each latch group recorded in the register.

6. The display driving device of claim 1, wherein the holding latches latch the image data output from the sampling latches during a section in which the latch enable signal is at a high level.

7. The display driving device of claim 6, wherein the signal generation circuit generates the latch enable signal so that high level sections of the latch enable signals for each latch group do not overlap each other.

8. A display driving device comprising:

a first array composed of sampling latches configured to latch n-bit image data for each channel;

a second array composed of holding latches configured to latch the image data latched in the sampling latches at a latch timing determined for each cell group;

a signal generation circuit configured to generate a latch enable signal which causes the holding latches to perform a latch operation at the latch timing determined for each cell group; and a third array composed of level shifters configured to shift a voltage level of the image data output from the holding latches, wherein the cell group is composed of latch cells at the same position among latch cells constituting each holding latch; and wherein the signal generation circuit generates the latch enable signal for each cell group so that bits of the image data are sequentially latched in an order from a first cell group composed of first latch cells in which significant bits (MSBs) of the image data for each channel are latched in the holding latches to an nth cell group composed of nth latch cells in which least significant bits (LSBs) of the image data for each channel are latched in the holding latches.

9. The display driving device of claim 8, wherein:

the latch enable signal for each cell group transitions from a low level to a high level when a first number of clock pulses is counted from a rising edge of a horizontal synchronization signal (Hsync) which indicates a start of one horizontal line, and transitions from the high level to the low level when a second number of clock pulses is counted from the rising edge; and the first number of clock pulses and the second number of clock pulses are set differently for each cell group.

10. The display driving device of claim 8, wherein the holding latches latch the image data output from the sampling latches during a section in which the latch enable signal is at a high level, and wherein the signal generation circuit generates the latch enable signal so that high level sections of the latch enable signals for each cell group do not overlap each other.

11. The display driving device of claim 8, further comprising a register in which different latch timings are recorded for each cell group, wherein the signal generation circuit generates the latch enable signal based on the latch timings for each cell group recorded in the register.

12. A method of driving a display system, comprising:

latching, by sampling latches, n-bit image data generated for each channel;

generating a latch enable signal which causes holding latches to perform a latch operation at different latch timings determined for each latch group or each cell group;

latching, by the holding latches, the image data latched in the sampling latches at the different latch timings according to the latch enable signal generated for each latch group or each cell group; and shifting a voltage level of the image data latched in the holding latches, wherein the latch group is composed of holding latches, and wherein, in the generating of the latch enable signal, the latch enable signal is generated for each cell group so that bits of the image data are sequentially latched in an order from a first cell group composed of first latch cells in which most significant bits (MSBs) of the image data for each channel are latched in the holding latches to an nth cell group composed of nth latch cells in which least significant bits (LSBs) of the image data for each channel are latched in the holding latches.

13. The method of claim 12, wherein a unit pixel included in a display panel is composed of a red sub-pixel, a first green sub-pixel, a blue sub-pixel, and a second green sub-pixel, and wherein the latch group includes a first latch group composed of holding latches configured to latch image data of the red sub-pixel, a second latch group composed of holding latches configured to latch image data of the first green sub-pixel, a third latch group composed of holding latches configured to latch image data of the blue sub-pixel, and a fourth latch group composed of holding latches configured to latch image data of the second green sub-pixel.

14. The method of claim 13, wherein, in the generating of the latch enable signal, the latch enable signal is generated so that the holding latches included in the second and fourth latch groups perform a latch operation before the holding latches included in the first and third latch groups.

15. The method of claim 12, wherein the cell group is composed of latch cells at the same position among latch cells constituting each holding latch.

16. The method of claim 12, wherein the holding latches latch the image data output from the sampling latches during a section in which the latch enable signal is at a high level.

17. The method of claim 12, wherein, in the generating of the latch enable signal, the latch enable signal for each latch group or each cell group transitions from a low level to a high level when a first number of clock pulses is counted from a rising edge of a horizontal synchronization signal (Hsync) which indicates a start of one horizontal line, and transitions from the high level to the low level when a second number of clock pulses is counted from the rising edge; and the first number of clock pulses and the second number of clock pulses are set differently for each latch group or each cell group.

* * * * *